United States Patent
Tuttle (10) Patent No.: US 8,471,711 B2
(45) Date of Patent: Jun. 25, 2013

(54) METHOD AND SYSTEMS OF TAGGING OBJECTS AND READING TAGS COUPLED TO OBJECTS

(75) Inventor: John R. Tuttle, Boulder, CO (US)

(73) Assignee: Round Rock Research, LLC, Jersey City, NJ (US)

( * ) Notice: Subject to any disclaimer, the term of this patent is extended or adjusted under 35 U.S.C. 154(b) by 0 days.

(21) Appl. No.: 13/539,629

(22) Filed: Jul. 2, 2012

(65) Prior Publication Data

US 2012/0268254 A1 Oct. 25, 2012

Related U.S. Application Data

(63) Continuation of application No. 12/830,658, filed on Jul. 6, 2010, now Pat. No. 8,212,680, which is a continuation of application No. 11/689,576, filed on Mar. 22, 2007, now Pat. No. 7,755,492.

(51) Int. Cl.
*G08B 13/14* (2006.01)
(52) U.S. Cl.
USPC ............................... 340/572.8; 340/572.7
(58) Field of Classification Search
USPC ............ 340/572.8, 572.7, 572.1, 572.9, 10.1, 340/10.5; 343/700, 850; 235/375, 385
See application file for complete search history.

(56) References Cited

U.S. PATENT DOCUMENTS

| | | | |
|---|---|---|---|
| 4,798,175 A | 1/1989 | Townsend et al. |
| 4,847,592 A | 7/1989 | Esch et al. |
| 4,972,198 A | 11/1990 | Feltz et al. |
| 5,320,067 A | 6/1994 | Legrain |
| 5,653,192 A | 8/1997 | Sheen et al. |
| 5,661,457 A | 8/1997 | Ghaffari et al. |
| 5,711,246 A | 1/1998 | Yano et al. |
| 5,959,526 A | 9/1999 | Tucker |
| 6,166,637 A | 12/2000 | Cyr et al. |
| 6,700,547 B2 | 3/2004 | Mejia et al. |
| 6,720,930 B2 | 4/2004 | Johnson et al. |
| 7,030,731 B2 | 4/2006 | Lastinger et al. |

(Continued)

FOREIGN PATENT DOCUMENTS

| | | |
|---|---|---|
| JP | 2006275839 A | 10/2006 |
| JP | 2006276995 A | 10/2006 |

(Continued)

OTHER PUBLICATIONS

International Patent Application PCT/US2D08f054868 International Search Report and Written Opinion (Corrected Version), mailed Sep. 19, 2008.

(Continued)

*Primary Examiner* — John A Tweel, Jr.
(74) *Attorney, Agent, or Firm* — Lerner, David, Littenberg, Krumholz & Mentlik, LLP (57) ABSTRACT

Methods and systems of tagging objects and reading tags coupled to objects. At least some of the illustrative embodiments are systems comprising a reading antenna, a tag reader coupled to the reading antenna, and a radio frequency identification (RFID) tag comprising a tag antenna electromagnetically coupled to the reading antenna. The RFID tag couples to an object such as the body of a living organism or a metallic article. Moreover, the tag antenna has a far-field radiation pattern in a direction away from the object that is substantially unaffected by proximity of the RFID tag to the object, and substantially unaffected by which surface of the RFID tag faces the object.

3 Claims, 5 Drawing Sheets

U.S. PATENT DOCUMENTS

| | | |
|---|---|---|
| 7,084,740 B2 | 8/2006 | Bridgelall |
| 7,102,520 B2 | 9/2006 | Liu et al. |
| 7,102,523 B2 | 9/2006 | Shanks et al. |
| 7,295,114 B1 | 11/2007 | Drzaic et al. |
| 7,755,492 B2 | 7/2010 | Tuttle |
| 8,212,680 B2 * | 7/2012 | Tuttle .................. 340/572.8 |
| 2006/0119487 A1 | 6/2006 | Atkinson et al. |
| 2006/0244605 A1 | 11/2006 | Sakama et al. |
| 2008/0238684 A1 | 10/2008 | Tuttle |
| 2009/0153299 A1 | 6/2009 | Ovard |

FOREIGN PATENT DOCUMENTS

| | | | |
|---|---|---|---|
| JP | 2006276999 | A | 10/2006 |
| KR | 100294189 | A | 5/1999 |
| KR | 20060066923 | A | 6/2006 |
| KR | 20060113369 | A | 11/2006 |
| WO | 2008118591 | A2 | 10/2008 |

OTHER PUBLICATIONS

International Patent Application PCT/US2008/054868 International Search Report, mailed Sep. 19, 2008.

International Patent Application PCT/US2DOS/054868 Written Opinion, mailed Sep. 20, 2008.

Symbol Technologies. Inc., "DC400 RFID Portal Solution from Symbol," located at http://WWW_symboLcom/DC4oo/, Oct. 2, 2006.

Symbol Technologies. Inc., "Two RF Inputs Make a Better RFID Tag," white paper. May 2006.

ThingMagic, Inc., "Mercury All-In Solution," product description, 2006.

Tuttle, John R., U.S. Appl. No. 11/689,576, filed Mar. 22, 2007.

VertMarkets, Inc., "MIA-COM Integrated RFID Antenna and Reader Systems," located at http://www.riidsolutionsonline.com, accessed Oct. 6, 2006.

"Mercury All-In Solution," ThingMagic Article, Oct. 6, 2008.

"Two RF Inputs Make A Better RFID tag," Symbol, Technical White Paper; May 2006, 5pp.

Website: http:\\www.symbol.com; "DC4oo RFID Portal Solution from Symbol," DC400 Portal System; Oct. 2, 2006.

Website: http:www.rfidsolutionsonline.com; RFID Solutions Online. TYCO Electronics Product Release, Oct. 6, 2006.

* cited by examiner

METHOD AND SYSTEMS OF TAGGING OBJECTS AND READING TAGS COUPLED TO OBJECTS

CROSS-REFERENCE TO RELATED APPLICATIONS

This application is a continuation of U.S. patent application Ser. No. 12/830,658, filed on Jul. 6, 2010, and due to issue as U.S. Pat. No. 8,212,680 on Jul. 3, 2012, which is a continuation of U.S. patent application Ser. No. 11/689,576, filed on Mar. 22, 2007, and issued as U.S. Pat. No. 7,755,492 on Jul. 13, 2010, the disclosures of which are incorporated herein by reference.

BACKGROUND OF THE INVENTION

The various embodiments are directed to radio frequency identification (RFID) tags for use with metallic articles and/or bodies of living organism, and systems for reading RFID tags.

Radio frequency identification (RFID) tags are used in a variety of applications, such as goods identification in wholesale and retail sales, access cards (e.g., building access, garage access), and badging and identification of employees. However, many industries have been slow to adopt the use RFID tags. For example, the cattle industry has been slow to adopt RFID tags as a means to identify particular animals because of difficulties in reading the RFID tags. In particular, depending on the physical placement of the RFID tag, the body of the animal may block the ability of a tag reader to read the RFID tag. Moreover, placing the antenna (e.g., loop or dipole antenna) of an RFID tag close to the body of the animal adversely affects the ability of the antenna to receive power, and also adversely affects the tag's ability to radiate power (for active tags) or reflect power (for passive tags). The same shortcomings affect industries where the underlying product is metallic.

BRIEF DESCRIPTION OF THE DRAWINGS

For a detailed description of various embodiments, reference will now be made to the accompanying drawings in which.

Certain terms are used throughout the following description and claims to refer to particular system components. As one skilled in the art will appreciate, design and manufacturing companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either an indirect or direct connection. Thus, if a first device couples to a second device, that connection may be through a direct connection or through an indirect connection via other intermediate devices and connections. Moreover, the term "system" means "one or more components" combined together. Thus, a system can comprise an "entire system," "subsystems" within the system, a radio frequency identification (RFID) tag, a RFID reader, or any other device comprising one or more components.

DETAILED DESCRIPTION

The various embodiments disclosed herein are discussed in the context of radio frequency identification (RFID) tags; however, the systems and methods discussed herein have application beyond RFID tags to other types of radio frequency technologies. The discussion of any embodiment in relation to RFID tags is meant only to be illustrative of that embodiment, and not intended to intimate that the scope of the disclosure, including the claims, is limited to that embodiment.

Figure 1:
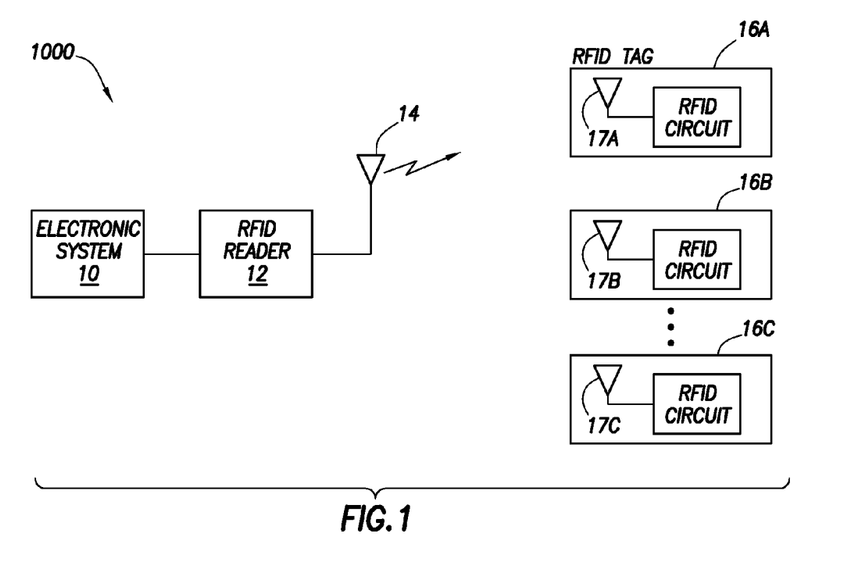
FIG. 1 shows a system in accordance with at least some embodiments.

FIG. 1 illustrates a system 1000 in accordance with at least some embodiments. In particular, system 1000 comprises an electronic system 10 coupled to a RFID reader 12. In some embodiments, electronic system 10 comprises a computer system. By way of antenna 14, the RFID reader 12 communicates with one or more RFID tags 16A-16C (each having antenna 17A-17C as shown) proximate to the RFID reader (i.e., within communication range). The RFID reader 12 may be equivalently referred as an interrogator. The RFID reader 12 passes data obtained from the various RFID tags 16 to the electronic system 10, which performs any suitable function. For example, the electronic system 10, based on the data received from the RFID tags 16, may allow access to a building or parking garage, note the entrance of an employee to a work location, direct a parcel identified by the RFID tag 16 down a particular conveyor system, or display an advertisement customized or targeted to the person identified by the RFID tag 16.

There are several types of RFID tags operable in the illustrative system 1000. For example, RFID tags may be active tags, meaning each RFID tag comprises its own internal battery. Using power from the internal battery, an active RFID tag monitors for interrogating signals from the RFID reader 12. When an interrogating signal is sensed, a response comprising a data or identification value is transmitted by the active RFID tag using power from its internal battery. A semi-active tag may likewise have its own internal battery, but a semi-active tag stays dormant most of the time. When an antenna of a semi-active tag receives an interrogating signal, the power received is used to wake or activate the semi-active tag, and a response comprising an identification value is sent by the semi-active RFID tag using power from its internal battery.

A third type of RFID tag is a passive tag, which, unlike active and semi-active RFID tags, has no internal battery. The antenna of the passive RFID tag receives an interrogating signal, and the power extracted from the received interrogating signal is used to power the tag. Once powered, the passive RFID tag may either of both of accept a command, or send a response comprising a data or identification value; however, the value is sent in the form of backscattered electromagnetic waves to the RFID reader 12 antenna 14 from the antenna 17 of the RFID tag 16. In particular, the RFID reader 12 and antenna 14 continue to transmit power after the RFID tag is awake. While the RFID reader 12 transmits, the antenna 17 of the RFID tag is selectively tuned and de-tuned with respect to the carrier frequency. When tuned, significant incident power is absorbed by the antenna 17 of the RFID tag 16 (and is used to power the underlying circuits). When de-tuned, significant power is reflected by the antenna 17 of the RFID tag 16 to the antenna 14 of the RFID reader 12. The data or identification value thus modulates the carrier in the form of reflected or backscattered electromagnetic wave. The RFID reader 12 reads the data or identification value from the backscattered electromagnetic waves. Thus, in this specification and in the claims, the terms transmitting and transmission include not only sending from an antenna using internally sourced power, but also sending in the form of backscattered signals.

Regardless of the type of RFID tag used (i.e., active, semi-active or passive) for the RFID reader 12 to interrogate the tag and receive return data, the antenna 17 of the RFID tag 16 is tuned to substantially the proper frequency, and the antenna directivity of the RFID tag 16 is in at least partial alignment with directivity of the antenna 14 of the RFID reader 12. However, dipole antennas and loop antennas tuned for free space tend to de-tune when placed proximate to metallic articles or water (e.g., a human or animal body). Moreover, directivity of the transmission (or receipt) of electromagnetic waves of dipole antennas and loop antennas degrades when the antennas are placed proximate to metallic articles or water. For example, a RFID tag in the form of an employee badge suspended proximate to the body may de-tune and/or have its antenna directivity affected to the extent that the RFID tag becomes unreadable when the RFID tag uses dipole or loop antennas.

Figure 2:
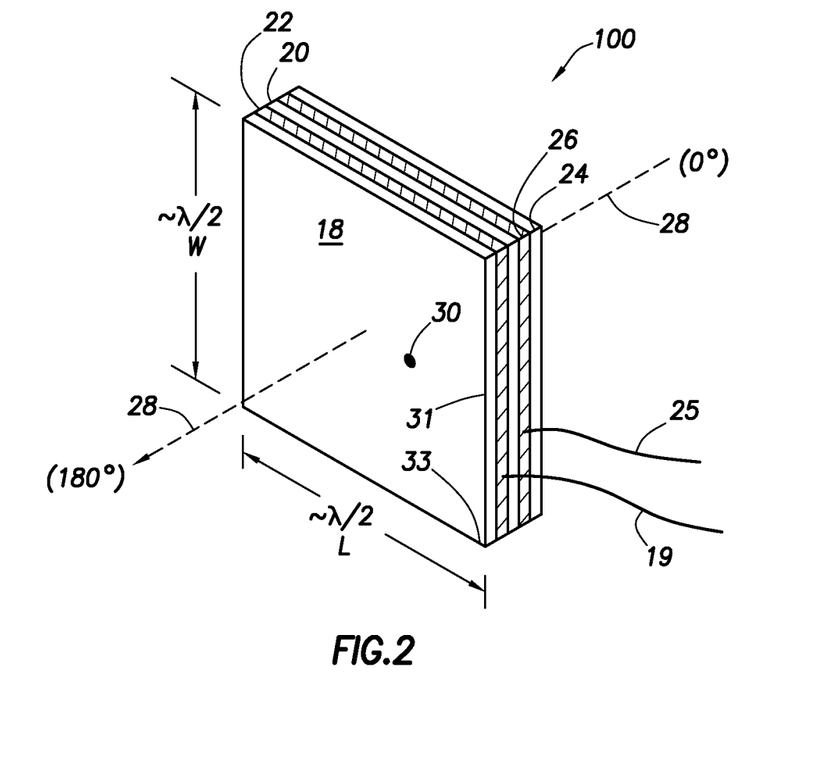
FIG. 2 shows a dual-sided patch antenna in accordance with at least some embodiments.

The various embodiments herein address the difficulties discussed above employing an antenna 17 in the RFID tag 16 that is quasi-omnidirectional and that is unaffected, or only slightly affected, by placement proximate to a metallic object or water. In particular, FIG. 2 shows a perspective view of a dual-sided patch antenna 100 in accordance with at least some embodiments. The dual-sided patch antenna 100 comprises a first radiative patch or antenna element 18. The antenna element 18 comprises a sheet of metallic material (e.g., copper) in the form of a square or rectangle in this example. The length and width of the antenna element 18 is dictated by the wavelength of the radio frequency signal that will be driven to the antenna element 18 (or that will be received by the antenna element 18), for example driven by way of lead 19. More particularly, the length and width of the antenna element 18 are each an integer ratio of the wavelength of the signal to be transmitted (or received). For example, the length and width may be approximately half the wavelength (h12) or a quarter of the wavelength (h14).

The dual-sided patch antenna 100 also comprises a ground plane or ground element 20. The antenna element 18 and the ground element 20 each define a plane, and those planes are substantially parallel in at least some embodiments. In FIG. 2, the ground element 20 length and width and the antenna element 18 length and width are shown to be approximately the same; however, the ground element length and width may be larger or smaller in other embodiments. Although the antenna element 18 and ground element 20 may be separated by air, in some embodiments a dielectric material 22 (e.g., printed circuit board material, silicon, plastic) separates the antenna element 18 from the ground element 20.

Still referring to FIG. 2, the dual-sided patch antenna 100 further comprises a second radiative patch or antenna element 24. Much like antenna element 18, the antenna element 24 comprises a sheet of metallic material (e.g., copper) in the form of a square or rectangle in this example. The antenna element 24 defines a plane, and in some embodiments the plane defined by antenna element 24 is substantially parallel to the plane defined by ground element 20 in some embodiments. The length and width of the antenna element 24 is dictated by the wavelength of the radio frequency signal that will be driven to the antenna element 24, for example driven by way of lead 25, and in some embodiments the length and width as between the antenna elements 18 and 24 are the same. Although the antenna element 24 may be separated from the ground element 20 by air, in other embodiments a dielectric material 26 (e.g., printed circuit board material, silicon, plastic) separates the antenna element 24 from the ground element 20. Each antenna element 18, 24 comprises a centroid axis 28 (i.e., centroid being the point considered to be the center), and in some embodiments the centroid axis 28 of each antenna element are substantially coaxial.

Radio frequency signals are driven to each of the antenna elements 18 and 24 by way of probe feeds or feed points (i.e., the locations where the radio frequency signals couple to the antenna elements), such as feed point 30 for antenna element 18 (the feed point for antenna element 24 not visible in FIG. 2). The feed points are coupled to their respective leads 19 (for feed point 30) and 25 (for the feed point of the antenna element 24). The following discussion is directed to antenna element 18 and feed point 30, but the discussion is equally applicable to antenna element 24. As illustrated, the feed point 30 resides within (internal of) an area defined by the length and width of the antenna, and the internal location of the feed point is selected based on several criteria. One such criterion is the impedance seen by a radio frequency source that drives the antenna element 18. For example, shifting the feed point toward the center of the antenna element 18 along its length ("L" in the figure) tends to lower the impedance seen by the radio frequency source, while shifting along the length towards an edge (e.g., edge 31) tends to increase impedance seen by the radio frequency source. Moreover, the placement of the feed point 30 also controls polarity of the electromagnetic wave created. For example, the feed point 30 as shown creates an electromagnetic wave whose electric field polarization is substantially along the length L. Shifting the feed point toward a corner (e.g., corner 33), or also using a second feed point centered along the length, creates a circularly polarized electromagnetic wave. Thus, the feed points are internal to the length and width to meet these, and possibly other, design criteria. The discussion now turns to directivity of the dual-sided patch antenna.

Figure 3A:
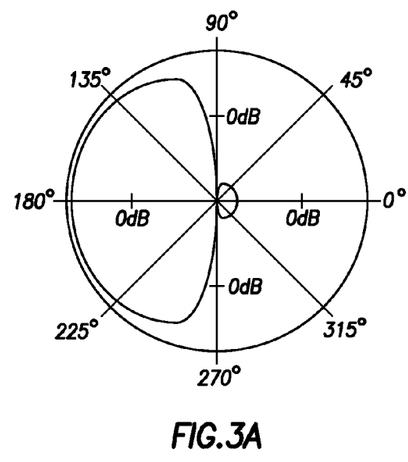
FIGS. 3A and 3B show far-field radiation (or reception) patterns for the antenna elements of the dual-sided patch antenna considered individually.
Figure 3B:
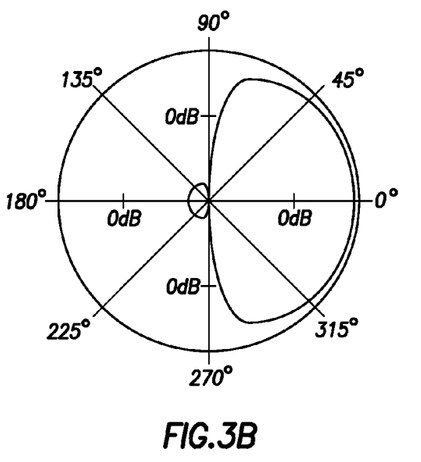
Figure 4:
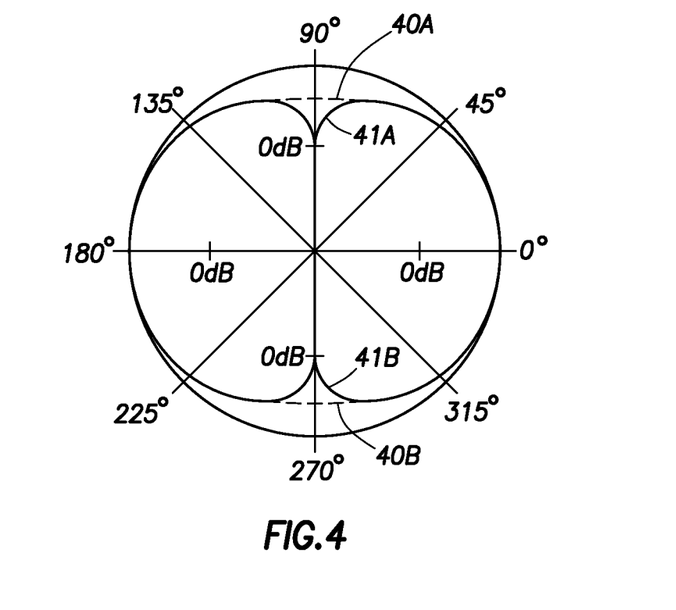
FIG. 4 shows the far-field radiation (or reception) pattern for the dual-sided patch antenna of various embodiments.

Consider for purposes of explanation that the centroid axis 28 lies along the 0"-180" axis in an overhead view (i.e., looking down on the length L from above) of the dual-sided antenna of FIG. 2, and that antenna element 18 faces the 180" direction while antenna element 24 faces the 0" direction. FIGS. 3A and 3B illustrate a far-field radiation pattern for each of the antenna elements 18 and 24 respectively. In particular, FIG. 3A shows that antenna element 18 considered alone has a far-field radiation pattern that is substantially directed along the centroid axis away from the ground element 20. The plot of FIG. 3A is valid for both overhead and elevational (i.e., looking horizontally toward the width W) plots of far field radiation. Likewise, antenna element 24 considered alone has a far-field radiation pattern that is substantially directed along the centroid axis away from ground element 20, and the plot (of FIG. 3B) is equally valid for both overhead and elevational plots of far-field radiation. Considering the far-field radiation patterns of antenna element 18 and antenna element 24 together, the dual-sided patch antenna 100 has a quasi-omnidirectional radiation (or reception) pattern, as illustrated in FIG. 4, with FIG. 4 equally valid for both overhead and elevational plots of far-field radiation. Stated otherwise, the far-field radiation pattern for the dual-sided patch antenna is substantially the same in all three spatial directions.

The far-field radiation patterns of FIGS. 3A, 3B and 4 show directivity, but one or more parameters of the physical system may affect the ultimate far-field radiation pattern. For example, ground elements larger than the antenna elements 18, 24 increase the size of the dips 41A and 41B at the 90" and 270" orientations, while a ground element the same size or slightly smaller may make the radiation pattern more circular (as indicated by dashed lines 40A and 40B). The far-field radiation patterns of FIGS. 3A, 3B and 4 also show gain (in decibels (dB)), but no specific numbers except that the gain may be greater than 0 dB in all directions. The actual gain values are related to parameters of the physical system such as frequency of operation and the dielectric strength of the dielectric material 22 and 26.

Although the radiation pattern illustrated in FIG. 4 is at least quasi-omnidirectional, an RFID tag comprising a dual-sided patch antenna, such as antenna 100, experiences less detrimental affects on tuning and directivity when placed proximate to a metallic article or water, as compared to single-sided patch antennas, dipole antennas and loop antennas. The benefits are especially noticeable when the antenna elements 18 and 24 are electrically isolated (discussed more below), thereby limiting interaction that allows one antenna element performance to affect the other. That is, while one antenna element 18 of the illustrative embodiments of FIG. 2 may be shielded between the metallic article or body and the ground element, the second antenna element 24 is relatively unaffected by the presence of the metallic article or body because of the electromagnetic isolation provided by the ground element. The amount of effect the nonshielded antenna element experiences are dependent to some extent upon how the antenna elements 18 and 24 are coupled to the underlying components.

Figure 5:
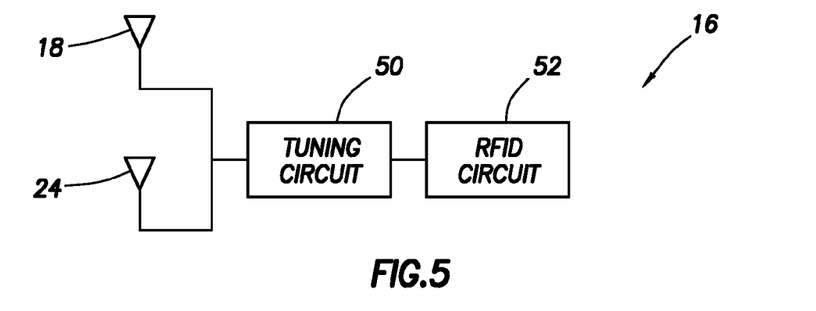
FIG. 5 shows an electrical block diagram of circuitry for coupling to the dual-sided patch antenna in accordance with at least some embodiments.

FIG. 5 illustrates an electrical block diagram of antenna elements 18 and 24 of a dual-sided patch antenna 100 coupled to underlying components. In particular, in the embodiments of FIG. 5 the antenna elements 18 and 24 are coupled together, and are coupled to a matching or tuning circuit 50. The purpose of the tuning circuit is to tune the two coupled antennas to be resonant at a particular frequency or set of frequencies. The tuning circuit, in turn, is coupled to an RFID circuit 52. The tuning circuit 50 and RFID circuit 52 may comprise an integrated product, such as the MCW42X family of products available from Microchip Technologies, Inc. of Chandler, Ariz. The RFID circuit 52 holds the identification value or values, and is responsible for transmitting the value to the reader (i.e., through broadcasting using power from an internal battery, or by backscatter using power from the interrogating signal). Embodiments as disclosed in FIG. 5 are operational, but when the one antenna element is placed proximate to a metallic article or water, the detuning effects of the placement affect the other antenna element, though not to the extent experienced by a dipole or loop antenna.

Figure 6:
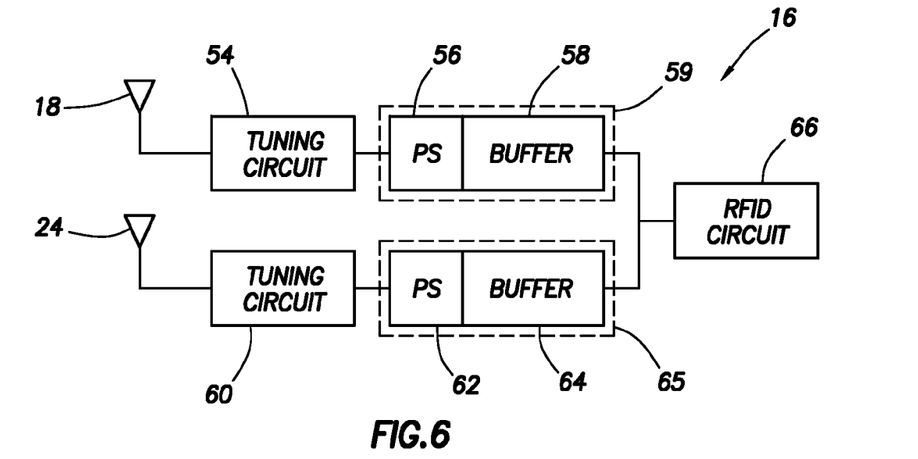
FIG. 6 shows an electrical block diagram of circuitry for coupling to the dual-sided antenna in alternative embodiments.

In alternative embodiments, the effects of placement of one antenna element proximate to a metallic article or water are reduced by electrically isolating the two antenna elements 18, 24 from each other. FIG. 6 shows an electrical block diagram of alternative embodiments where the two antenna elements of the dual-sided patch antenna 100 are electrically isolated from each other by way of additional isolation circuits. In particular, antenna 18 is coupled to tuning circuit 54, which in turn couples to an additional isolation circuit 59 and RFID circuit 66. In these embodiments, the isolation circuit 59 may comprise one or more of a power supply (PS) 56 and optional additional buffer 58. Likewise, antenna 24 is coupled to tuning circuit 60, which in turn couples to isolation circuit 65 and RFID circuit 66. Further in these embodiments, the isolation circuit 65 may comprise one or more of a power supply (PS) 62 and an optional additional buffer 64. Operation of the power supply and buffer is discussed with respect to antenna 18, but the discussion is equally applicable to antenna 24. When antenna 18 is not exposed to an interrogating signal from a RFID reader 12 (FIG. 1), the buffer 58 electrically isolates (or de-couples) the antenna element 18 from the RFID circuit 66. However, when exposed to interrogating signal, the buffer 58 couples the antenna 18 to the RFID circuit 66. In active tags, a battery may be the power supply 56 to provide power to sense electromagnetic signals received by the antenna element 18, and to control the additional buffer 58. Because the power supply 56 may be self powered, the location of the power supply 56 and the buffer 58 may be reversed. Moreover, a rectifying circuit may be present either in the power supply 56 or buffer 58 to convert incoming data and commands to baseband data. Using battery power, the buffer 58 continuously or periodically determines if antenna element 18 is receiving an interrogating signal. If so, the buffer 58 couples the antenna element 18 the RFID circuit 66 (e.g., by biasing the gate of a transistor to allow coupling of at least a portion of the interrogating signal to the RFID circuit 66), with power to run the buffer provided from the battery.

In semi-active and passive tags, the power supply 56 rectifies received power from the interrogating signal, converts the received power to direct current (DC) (e.g., using Schottky diodes), and uses at least some of the converted power to control the buffer 58. For example, the buffer 58 may be configured to electrically isolate the antenna element 18 from the RFID circuit 66 when no power is provided from the power supply 56 (i.e., when there is no interrogating signal being received by the antenna element). When an interrogating signal is incident upon the antenna element 18, the power supply 56 extracts power from the signal, and uses the power to drive the buffer and couple the antenna element 18 to the RFID circuit 66. Thus, regardless of the tag type, when an interrogating signal is received on antenna element 18, the signal is coupled to the RFID circuit 66, which responds to the reader 12 (FIG. 1) with an identification value.

Figure 7:
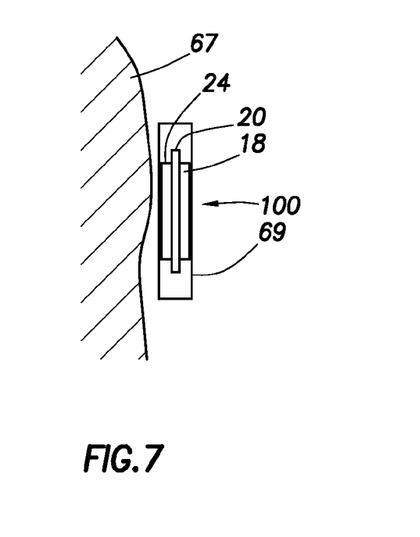
FIG. 7 shows an elevational, cross-sectional view of a badge comprising dual-sided patch antenna proximate to a body.

Consider now a situation of a RFID tag 16 comprising the circuits as shown in FIG. 6, with the RFID tag located proximate to a metallic article or water. In particular, FIG. 7 shows an elevational cross-sectional view of a badge 69 comprising a dual-sided patch antenna 100, with the badge 69 proximate to an object being a body 67. Antenna element 24 resides between the ground element 20 and the body 67, while antenna element 18 faces away from the body 67. When the RFID tag 16 is exposed to an interrogating signal from a RFID reader 12, very little if any of the interrogating signal is received by antenna element 24, and thus the buffer 64 (FIG. 6) keeps antenna element 24 de-coupled from the RFID circuit 66. However, antenna element 18 faces the opposite direction and receives power from the interrogating signal. At least a portion of the received power is converted by power supply 56 (in semi-active and passive tags), and the buffer 58 couples the antenna element 18 to the RFID circuit 66. Here, however, because of the electrical isolation of the antenna element 24 from antenna element 18, any detuning effects of antenna element 24 resulting from its placement does not affect antenna element 18. With the situation reversed, and antenna element 18 shielded between the object and the ground element 20, antenna element 24 receives the interrogating power and becomes the active antenna element.

Figure 8:
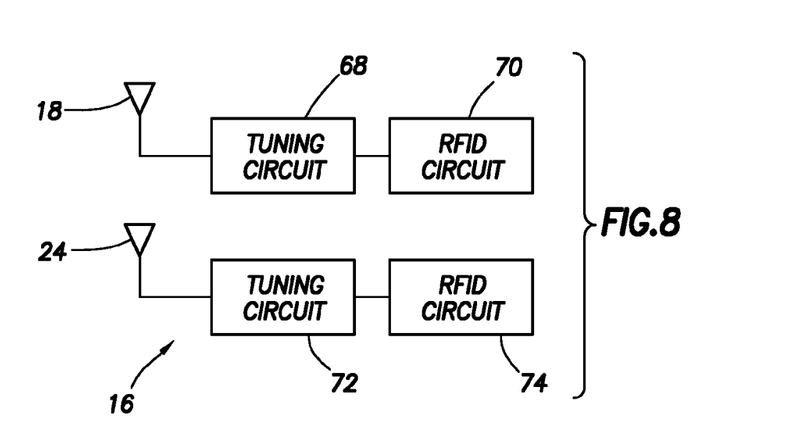
FIG. 8 shows an electrical block diagram of circuitry for coupling to the dual-sided antenna in further alternative embodiments.

FIG. 8 illustrates yet still further alternative embodiments of a RFID tag 16. In particular, in the embodiments illustrated in FIG. 8 each antenna element 18, 24 of the dual-sided patch antenna 100 couples to its own tuning circuit and RFID circuit. Antenna element 18 couples to tuning circuit 68 and RFID circuit 70, while antenna element 24 couples to tuning circuit 72 and RFID circuit 74. Much like the embodiments of FIG. 6, in the embodiments of FIG. 8 the detuning effects of one antenna element being proximate to an object does not affect tuning of the antenna element on the opposite side of the ground element 20, thus achieving near total isolation of the two antenna elements. RFID circuits 70 and 74 may be designed and configured to hold and provide the same identification values when interrogated, or different values. Thus, when interrogated the RFID circuits 70 and 74 may respond with the same value, or with different values. Further, the two RFID circuits may be coupled in order to share data or to enable other functionality.

Figure 9:
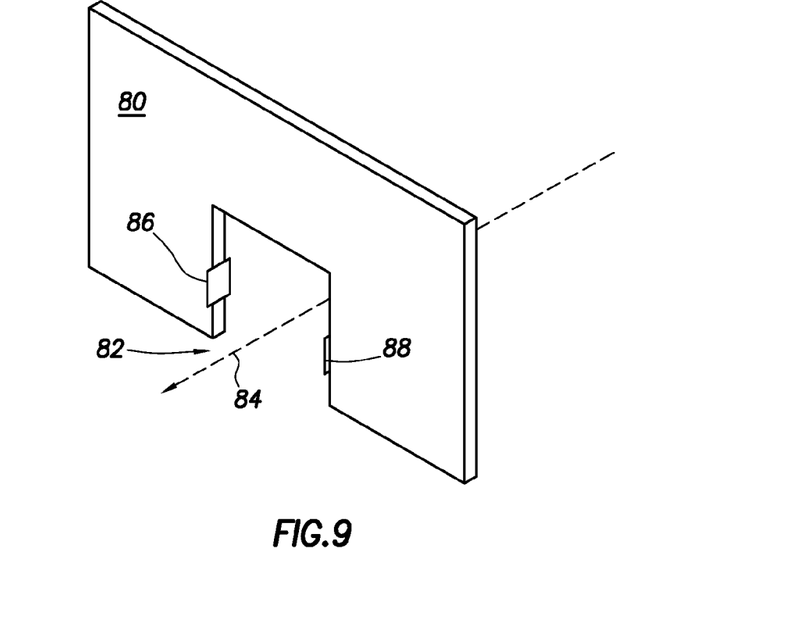
FIG. 9 shows a perspective view of an arrangement of reading antennas in accordance with at least some embodiments.

In order to address difficulties associated with reading RFID tags 16 because of placement or position of the RFID tag relative to an object and the reading antenna 14, at least some embodiments use two reading antennas positioned on opposite sides of an expected path of travel of the RFID tag 16. FIG. 9 illustrates a wall 80 having an aperture or portal 82 (e.g., a doorway). Dashed line 84 illustrates a centerline of an expected path of travel of RFID tags 16 through the portal 82. In order to ensure that the RFID tags 16 passing through the portal 82 are not shielded by the article or body to which they are attached, or shielded by nearby articles or bodies, in these embodiments two reading antennas are used: reading antenna 86 on a first side of the portal 82, and reading antenna 88 (only partially visible) on a second side of the portal 82, opposite the first side. Thus, for example, an employee having a badge with an RFID tag 16 hanging on the right side of his/her body and traveling in the direction indicated by dashed line 84 has the RFID tag 16 read by reading antenna 86. Likewise, an employee having a badge with an RFID tag 16 hanging on the left side of his/her body and traveling in the direction indicated by dashed line 84 has the RFID tag 16 read by the reading antenna 88.

If the articles, people or animals moving through the portal 82 could be constrained to movement in single file, the embodiments of FIG. 9 could read most if not all RFID tags 16 passing through the portal 82; however, constraint to single-file passage through the portal 82 is not always possible, particularly in the case of multiple people (who tend to walk side-by-side), and multiple animals (such as cattle) which tend to bunch in stressful situations (such as cattle working operations). In such situations, even though the RFID tag 16 may be on the same side of the object (i.e., article or body) as one of the reading antennas 86, 88, the second object in the portal may shield the RFID tag 16 from being read. In order to at least partially address such concerns, other embodiments elevate at least one of the reading antennas above the centerline of the expected path of travel of the RFID tag 16.

Figure 10:
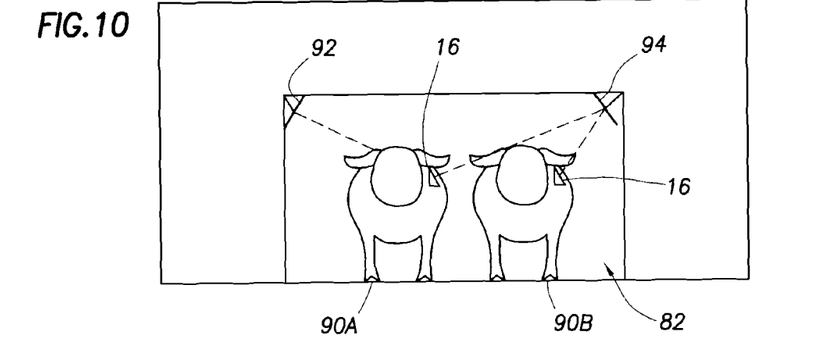
FIG. 10 shows an elevational view of an arrangement of reading antennas in accordance with alternative embodiments.

FIG. 10 is an elevational view showing two animals 90A and 90B passing through portal 82. As shown, the illustrative animals 90A and 90B have RFID tags 16 attached to their left ears (but the tags may be in the right ears or other locations). Because of the side-by-side positioning of the animals 90, reading antennas at substantially the same elevation as the RFID tags 16 will be unable to read the RFID tags because the animals' heads/bodies block or shield the antennas. To address such situations, the reading antennas 92 and 94 in these embodiments are positioned above the elevation of the RFID tags 16 to be read. Thus, in the illustrative situation of FIG. 10, while reading antenna 92 may be unable to read the RFID tags 16, reading antenna 94 is positioned to be able to read the RFID tags 16. If the RFID tags were located in each animal's right ear, then the situation would be reversed.

The elevation difference between the RFID tags 16 and the reading antennas 92, 94 is dependent upon the height of the object/body to which the RFID tag 16 is attached, and the expected location of the RFID tag 16. For the illustrative animals of FIG. 10, the animals may be as tall as 4.5 to 5 feet, and the RFID tags 16 attached to each animal's ear are relatively near the 4.5 to 5 feet (if a particular animal's head is up). Thus, the elevation difference between the RFID tags 16 and the reading antennas 92 and 94 may be on the order of a few feet. Where the animals' heads are consistently down, or where the RFID tag location is significantly below the top of the animal, the reading antennas 92 and 94 may need to be at least one to one and half time the expected elevation of the RFID tags 16, and in some embodiments at least twice the expected elevation of the RFID tags 16.

The various placements of the reading antennas discussed to this point address many situations where shielding of the RFID tags 16 by the articles/bodies to which they attach, or are shielded by nearby articles/bodies. However, there may be further situations where even multiple antennas and antennas at higher elevations than the RFID tags 16 are unable to consistently read passing RFID tags. For example, consider two people walking side-by-side, with each person having the RFID tag 16 at chest or waist level. The height of the person along with the placement of the RFID tags 16 may dictate an elevation difference between the reading antennas 92, 94 and the RFID tags 16 that is not achievable.

Figure 11:
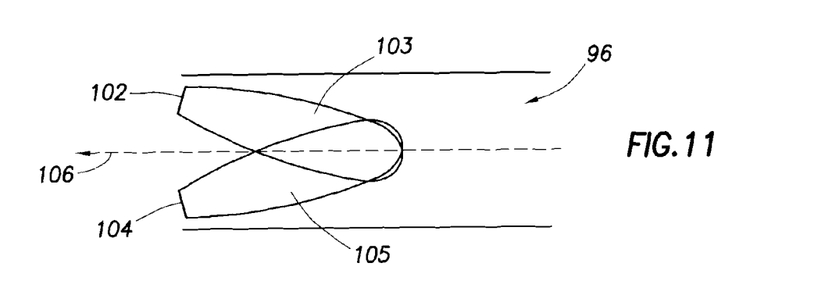
FIG. 11 shows an overhead view of an arrangement of reading antennas in accordance with alternative embodiments.

FIG. 11 illustrates alternative embodiments where the directivity of the reading antennas (that is, at least the main lobe of the far-field radiation or reception pattern) is directed upstream of the expected path of travel of the RFID tag 16. In particular, FIG. 11 is an overhead view of a walkway 96 (e.g., a hallway in a building, a cattle working chute, or conveyor system) having two reading antennas 102 and 104 in operational relationship to the walkway 96. A main lobe 103 of a far-field radiation (reception) pattern of reading antenna 102 encompasses the centerline 106 of the expected path of travel, and in the specific embodiments of FIG. 11, the main lobe 103 of the far-field radiation pattern is directed upstream of the location of the reading antenna 102. Likewise, the main lobe 105 of the far-field radiation (reception) pattern of reading antenna 104 encompasses the centerline 106 of the expected path of travel upstream of the location of the reading antenna 102. In this way, RFID tags that are shielded from the reading antennas when the attempt is made to read the tags as they pass through a portal are instead read as they approach the portal. Consider, for example, two people walking side-by-side as discussed in the immediately preceding paragraph. As the two humans approach the reading antennas 102 and 104 moving in the direction as shown by arrow 106, the RFID tags at chest or waist level are exposed to one or both the reading antennas 102 and 104 for reading.

The embodiments discussed with respect to FIG. 11 are equivalently operable when the main lobes of the far-field radiation patterns are directed downstream from the position of the antennas (i.e., RFID tags are read as they move away from the reading antennas). Moreover, the embodiments of elevating the reading antennas above the expected elevation of the RFID tags may be combined with the upstream or downstream directed reading antennas, such that the main lobes of the reading antennas are not only directed upstream (or downstream) of the location of the reading antennas, but also the main lobes are directed downward toward the centerline of the expected path of travel. Directing the main lobes of multiple reading antennas upstream (or downstream) increases the enhances a system's ability to read RFID tags that are potentially shielded by objects to which the RFID tags attach, or by objects proximate to the RFID tags.

Figure 12A:
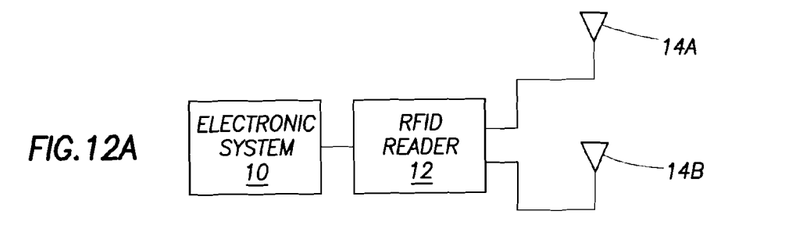
FIGS. 12A and 12B show electrical block diagrams of various embodiments of coupling reading antennas to readers.
Figure 12B:
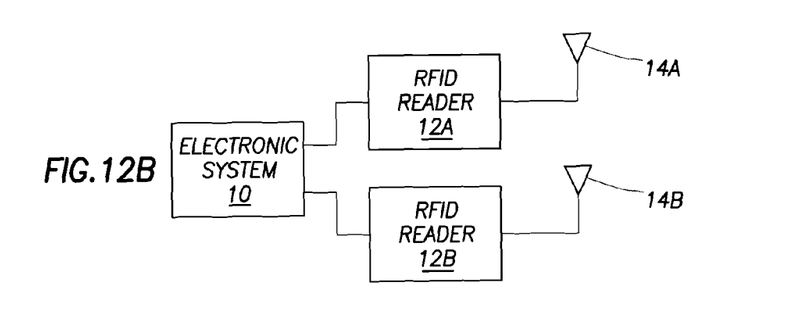

Coupling of the RFID reader 12 (FIG. 1) to the various reading antennas (represented by antenna 14 in FIG. 1) may take many forms. For example, FIG. 12A illustrates embodiments where the RFID reader 12 couples to a set of reading antennas 14A and 14B (which reading antennas 14A and 14B could be any of the reading antennas 86 and 88, 92 and 94, or 102 and 104). The RFID reader 12 may transmit and receive from both antennas simultaneously, or the RFID reader 12 may multiplex between the two antennas. FIG. 12B illustrates systems where computer system 10 couples to two RFID readers 12A and 12B, one RFID reader each for each antenna 14A and 14B respectively. Here again, the reading antennas 14A and 14B could be any of the reading antennas 86 and 88,92 and 94, or 102 and 104.

Figure 13:
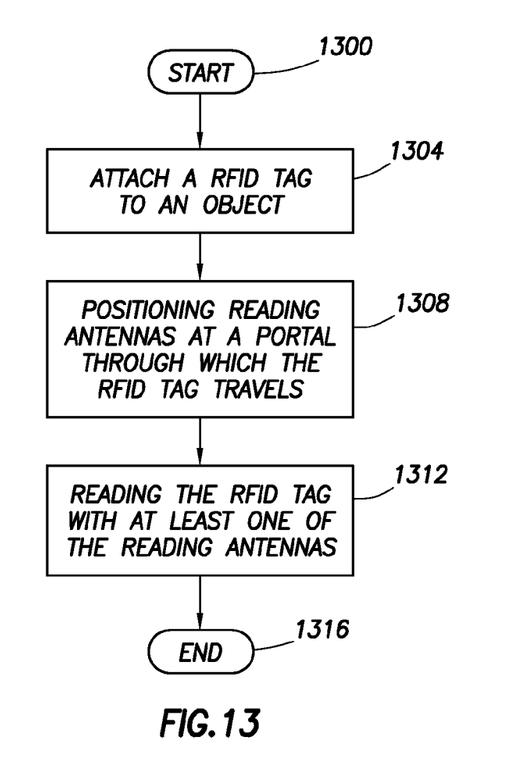
FIG. 13 shows a method in accordance with at least some embodiments.

FIG. 13 illustrates a method in accordance with at least some embodiments. In particular, the method starts (block 1300) and proceeds to attaching a RFID tag to an object (block 1304). In some embodiments, the far-field radiation pattern of the RFID tag in a direction away from the object is substantially unaffected by which surface of the RFID tag faces away from the object, and is also substantially unaffected by proximity of the RFID tag to the object. Thus, in some embodiments the RFID tag comprises a dual-sided patch antenna 100, where each "surface" of the RFID tag is that portion of the tag that covers or is on the same side as one of the antenna elements. The attaching of the RFID tag to an object may take many forms. For example, the attaching may comprise: attaching a badge comprising an RFID tag to the object being a human; attaching the RFID tag to an object being a non-human animal; attaching the RFID tag to an object being a non-human animal, the attaching by way of an ear; and attaching the RFID tag to an object being a bovine, the attaching by way of an ear; or attaching the RFID tag to a metallic article. Moreover, the attaching may be at a particular nominal or tag elevation.

Still referring to FIG. 13, the next step in the illustrative method may be positioning reading antennas at a portal through which the RFID tag travels (block 1308). The positioning may take many forms. In some embodiments the reading antennas are placed on two sides of the portal, with the sides being opposite in some cases. Further, at least one of the reading antennas may be positioned at an elevation above the expected tag elevation, and in some cases both reading antennas are positioning above the tag elevation. Further, in some embodiments main lobes of the far-field radiation patterns of the reading antennas are directed upstream or downstream of the expected path of travel. Further still, the reading antennas may be placed at elevations higher than the tag elevation, and have their main lobes directed upstream or downstream. Finally, the RFID tag is read by at least one of the reading antennas (block 1312), and the illustrative process ends (block 1316).

Still referring to FIG. 13, a next step in the illustrative method is reading the RFID tag using at least one of a pair of reading antennas (block 1308). The reading may take many forms. In some embodiments, the reading is by a pair of reading antennas positioned on opposite sides of a portal through which the RFID tags move. In other embodiments, the reading antennas are positioned above the expected elevation of the RFID tags (i.e., are downward looking). In yet still other embodiments, the reading antennas are positioned such that their directivity (i.e., at least the main lobe of the far-field radiation or reception pattern) is directed upstream of an expected path of travel, and also encompasses the centerline of the expected path of travel. In other embodiments, the reading antennas are positioned such that their directivity (i.e., far-field radiation or reception pattern) is directed downstream of an expected path of travel, and also encompasses the centerline of the expected path of travel. Thereafter, the process ends (block 1312).

The dual-sided patch antenna 100 of FIG. 2 may be constructed in several ways. In some embodiments, the antenna 100 may be constructed using flexible sheets of metallic and dielectric material adhered together and cut to appropriate dimensions. In alternative embodiments, the antenna 100 may be manufactured, such as by deposition of the metallic portions and growth of dielectric portions by way of semiconductor manufacturing techniques. In yet still other embodiments, the antenna 100 may be constructed using a combination of techniques, such as depositing metallic layers on a dielectric material such as a printed circuit board (PCB), and then mechanically coupling two or more PCBs to form the antenna.

The above discussion is meant to be illustrative of the principles and various embodiments of the present invention. Numerous variations and modifications will become apparent to those skilled in the art once the above disclosure is fully appreciated. Further, while the antenna 100 is shown with a single ground element 20, the dual-sided patch antenna 100 may be manufactured by adhering two patch antennas back-to-back, meaning that two ground elements may be present, yet same advantages achieved. Moreover, significant advantages can be achieved with the antenna placement as described herein in combination with RFID tags having antennas other than the dual-sided patch antennas (e.g., dipole and loop antennas). It is intended that the following claims be interpreted to embrace all such variations and modifications.

The invention claimed is:
1. A system comprising:
a first RFID circuit comprising a first antenna element and a first isolation circuit; and
a second RFID circuit comprising a second antenna element,
wherein in the event that the first antenna element is not exposed to an interrogating signal, the first isolation circuit decouples the first antenna element from the first RFID circuit.

2. The system of claim 1, wherein the second RFID circuit comprises a second isolation circuit for electrically isolating the second antenna element from the first antenna element.

3. The system of claim 1, wherein the first RFID circuit and the second RFID circuit are attached to the same object.

* * * * *